United States Patent
Xu (10) Patent No.: US 12,200,357 B2
(45) Date of Patent: Jan. 14, 2025

(54) WAKE-UP METHOD FOR SURVEILLANCE CAMERA, SURVEILLANCE CAMERA, AND NON-TRANSITORY COMPUTER-READABLE STORAGE MEDIUM

(71) Applicant: ZHEJIANG UNIVIEW TECHNOLOGIES CO., LTD., Zhejiang (CN)

(72) Inventor: Xiaojun Xu, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 68 days.

(21) Appl. No.: 18/005,548

(22) PCT Filed: Dec. 29, 2020

(86) PCT No.: PCT/CN2020/140656
§ 371 (c)(1),
(2) Date: Jan. 13, 2023

(87) PCT Pub. No.: WO2022/011986
PCT Pub. Date: Jan. 20, 2022

(65) Prior Publication Data
US 2023/0269462 A1    Aug. 24, 2023

(30) Foreign Application Priority Data
Jul. 14, 2020    (CN) .......................... 202010673632.X (51) Int. Cl.
*H04N 5/335*    (2011.01)
*G06V 10/75*    (2022.01)
(Continued)

(52) U.S. Cl.
CPC ......... *H04N 23/651* (2023.01); *G06V 10/751* (2022.01); *G06V 20/46* (2022.01);
(Continued)

(58) Field of Classification Search
CPC .................................................. H04N 23/651
See application file for complete search history.

(56) References Cited

U.S. PATENT DOCUMENTS

| 11,381,743 B1* | 7/2022 | Mahbub ................. H04N 23/65 |
| 2013/0215266 A1 | 8/2013 | Trundle et al. |

(Continued)

FOREIGN PATENT DOCUMENTS

| CN | 101404760 A | 4/2009 |
| CN | 107707887 A | 2/2018 |
| CN | 109963046 A | 7/2019 |

OTHER PUBLICATIONS

International Search Report in Application No. PCT/CN2020/140656 dated Mar. 25, 2021, 4 pages including translation.

(Continued)

*Primary Examiner* — Gary C Vieaux
(74) *Attorney, Agent, or Firm* — Morgan, Lewis & Bockius LLP (57) ABSTRACT

Provided are a wake-up method and device for a surveillance camera, a surveillance camera and a medium. The surveillance camera includes a detection sensor and an image sensor. The wake-up method for a surveillance camera includes: in response to the detection sensor detecting presence of an intrusion target in a surveilled region, controlling the image sensor to enter a first image acquisition mode; controlling the image sensor in the first image acquisition mode to acquire at least two frames of surveillance images; determining whether the intrusion target is a surveilled target according to the at least two frames of surveillance images; and in response to determining that the intrusion target is a surveilled target, switching the image sensor from the first image acquisition mode to a second image acquisition mode, and controlling the image sensor in (Continued)

the second image acquisition mode to acquire a surveillance image having the surveilled target.

17 Claims, 6 Drawing Sheets

(51) Int. Cl.
    *G06V 20/40*     (2022.01)
    *G06V 20/52*     (2022.01)
    *G08B 13/196*     (2006.01)
    *H04N 23/65*     (2023.01)
    *H04N 23/667*     (2023.01)

(52) U.S. Cl.
    CPC ....... *G06V 20/52* (2022.01); *G08B 13/19602* (2013.01); *H04N 23/667* (2023.01)

(56) References Cited

U.S. PATENT DOCUMENTS

| | | | |
|---|---|---|---|
| 2014/0118592 A1* | 5/2014 | Yoon | H04N 25/78 348/308 |
| 2016/0080652 A1* | 3/2016 | Shirota | G06K 7/1404 348/222.1 |
| 2017/0339343 A1 | 11/2017 | Zhang et al. | |
| 2017/0353699 A1* | 12/2017 | Wang | G08B 13/19695 |
| 2019/0141297 A1 | 5/2019 | Vaidya et al. | |
| 2019/0199976 A1* | 6/2019 | Chao | G08B 13/19695 |
| 2021/0027590 A1* | 1/2021 | Lin | G06T 7/11 |

OTHER PUBLICATIONS

Chinese Office Action in Application No. 202010673632.X dated Apr. 12, 2022, 5 pages including translation.
Extended European Search Report in Application No. 20945508.8, dated Jun. 20, 2024, 7 pages.

* cited by examiner

WAKE-UP METHOD FOR SURVEILLANCE CAMERA, SURVEILLANCE CAMERA, AND NON-TRANSITORY COMPUTER-READABLE STORAGE MEDIUM

CROSS REFERENCE TO RELATED APPLICATIONS

This is a National Stage Application filed under 35 U.S.C. 371, based on International Patent Application No. PCT/CN2020/140656, filed on Dec. 29, 2020, which claims priority to Chinese Patent Application No. 202010673632.X filed with the China National Intellectual Property Administration (CNIPA) on Jul. 14, 2020, the disclosures of which are incorporated herein by reference in their entireties.

TECHNICAL FIELD

Embodiments of the present application relate to the field of cameras technologies, for example, a wake-up method for a surveillance camera, a surveillance camera and a non-transitory computer-readable storage medium.

BACKGROUND

In the field of surveillance, a surveillance camera is generally powered by a battery. To save the charge of the battery and prolong the use time of the surveillance camera, when a detection sensor fails to detect an intrusion target, the surveillance camera is in a sleep mode, and when the detection sensor successfully detects an intrusion target, the surveillance camera needs to be woken up so that the awakened surveillance camera performs surveillance image shooting.

Generally, the intrusion target detected by the detection sensor includes a pedestrian and another animal except the pedestrian. When a surveilled target of the surveillance camera is a pedestrian, the surveillance camera is woken up frequently by mistake since the detection sensor detects that the pedestrian is wandering at an edge of a field of view of the detection sensor or detects that the intrusion target is another animal, thereby accelerating the charge consumption of the battery of the surveillance camera and increasing the replacement frequency of the battery.

SUMMARY

Embodiments of the present application provide a wake-up method for a surveillance camera, a surveillance camera and a non-transitory computer-readable storage medium, improving the wake-up accuracy of the surveillance camera, reducing the charge consumption of a battery of the surveillance camera, prolonging the use time of the surveillance camera and reducing the replacement frequency of the battery.

In a first aspect, embodiments of the present application provide a wake-up method for a surveillance camera, which is executed by a surveillance camera including a detection sensor and an image sensor, and includes the steps described below.

In response to the detection sensor detecting the presence of an intrusion target in a surveilled region, the image sensor is controlled to enter a first image acquisition mode, where the first image acquisition mode is a low-power image acquisition mode.

The image sensor in the first image acquisition mode is controlled to acquire at least two frames of surveillance images.

Whether the intrusion target is a surveilled target is determined according to the at least two frames of surveillance images.

In response to determining that the intrusion target is a surveilled target, the image sensor is switched from the first image acquisition mode to a second image acquisition mode, and the image sensor in the second image acquisition mode is controlled to acquire a surveillance image having the surveilled target, where the second image acquisition mode is a normal image acquisition mode.

In a second aspect, embodiments of the present application further provide a surveillance camera. The surveillance camera includes a detection sensor, an image sensor, at least one processor and a storage apparatus.

The detection sensor is configured to detect whether an intrusion target is present in a surveilled region.

The image sensor is configured to acquire a surveillance image of the surveilled region.

The storage apparatus is configured to store at least one program.

The at least one program, when executed by the at least one processor, causes the at least one processor to implement: in response to the detection sensor detecting presence of an intrusion target in a surveilled region, controlling the image sensor to enter a first image acquisition mode, where the first image acquisition mode is a low-power image acquisition mode; controlling the image sensor in the first image acquisition mode to acquire at least two frames of surveillance images; determining whether the intrusion target is a surveilled target according to the at least two frames of surveillance images; and in response to determining that the intrusion target is a surveilled target, switching the image sensor from the first image acquisition mode to a second image acquisition mode, and controlling the image sensor in the second image acquisition mode to acquire a surveillance image having the surveilled target, where the second image acquisition mode is a normal image acquisition mode.

In a third aspect, embodiments of the present application further provide a non-transitory computer-readable storage medium on which a computer program is stored, where the computer program, when executed by a processor, implements: in response to the detection sensor detecting presence of an intrusion target in a surveilled region, controlling the image sensor to enter a first image acquisition mode, where the first image acquisition mode is a low-power image acquisition mode; controlling the image sensor in the first image acquisition mode to acquire at least two frames of surveillance images; determining whether the intrusion target is a surveilled target according to the at least two frames of surveillance images; and in response to determining that the intrusion target is a surveilled target, switching the image sensor from the first image acquisition mode to a second image acquisition mode, and controlling the image sensor in the second image acquisition mode to acquire a surveillance image having the surveilled target, where the second image acquisition mode is a normal image acquisition mode.

BRIEF DESCRIPTION OF DRAWINGS

FIG. 1A is a schematic diagram of an image dimension when an image sensor is controlled to perform surveillance image shooting in a normal image acquisition mode based on a trigger instruction of a detection sensor in the related art according to an embodiment of the present application.

FIG. 1B is a schematic diagram of an image dimension when an image sensor is controlled to perform surveillance image shooting in a first image acquisition mode based on a trigger instruction of a detection sensor according to an embodiment of the present application.

FIG. 1C is a schematic diagram illustrating that an image sensor is switched from a first image acquisition mode to a second image acquisition mode according to an embodiment of the present application.

DETAILED DESCRIPTION

A wake-up method and device for a surveillance camera, a surveillance camera and a medium according to embodiments of the present application are described in detail below with reference to drawings.

Figure 1:
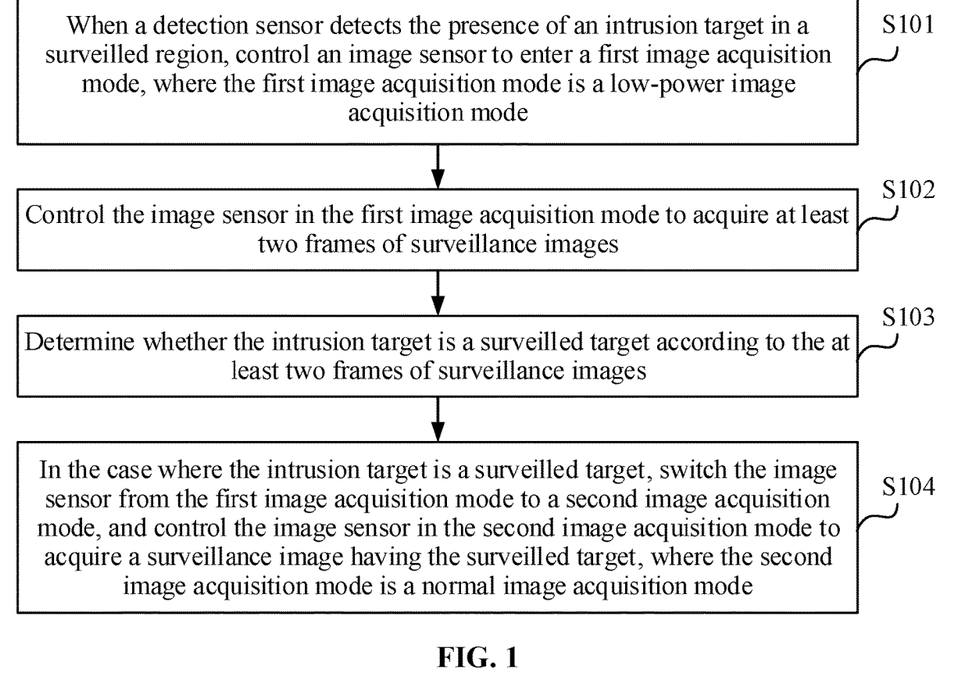
FIG. 1 is a flowchart of a wake-up method for a surveillance camera according to an embodiment of the present application.

The wake-up method for a surveillance camera provided in an embodiment of the present application is described in conjunction with FIG. 1. FIG. 1 is a flowchart of a wake-up method for a surveillance camera according to an embodiment of the present application. The embodiment of the present application is applicable to a scenario where a surveillance camera is woken up. The method is performed by the wake-up device for a surveillance camera provided in an embodiment of the present application. The device is composed of hardware and/or software and integrated in the surveillance camera. In an embodiment of the present application, the surveillance camera is a low-power battery camera. As shown in FIG. 1, the method includes S101 to S104.

In S101, when a detection sensor detects the presence of an intrusion target in a surveilled region, an image sensor is controlled to enter a first image acquisition mode, where the first image acquisition mode is a low-power image acquisition mode.

In the embodiment of the present application, the detection sensor may be, but is not limited to, a passive infrared (PIR) sensor, an ultrasonic radar, a millimeter wave radar or the like, which is not limited here.

The surveilled region refers to a field of view of the detection sensor or a field of view of the surveillance camera.

The intrusion target includes a pedestrian or another animal except the pedestrian, which is not limited here.

In an embodiment, when the surveillance camera is equipped with a battery and in an operating state, the detection sensor in the surveillance camera detects the surveilled region in real time to determine whether an intrusion target is present in the surveilled region. If the detection sensor detects the presence of an object in the surveilled region, it is determined that an intrusion target is present in the surveilled region. If the detection sensor detects that no object is present in the surveilled region, it is determined that no intrusion target is present in the surveilled region.

When the detection sensor in the related art detects the presence of an intrusion target in the surveilled region, the detection sensor in the related art directly sends a wake-up instruction to the surveillance camera, so as to wake up the surveillance camera to perform surveillance image shooting through the image sensor. As shown in FIG. 1(a), when the surveillance camera is woken up to perform the surveillance image shooting through the image sensor, the image sensor performs the image shooting operation based on an image dimension corresponding to a normal image acquisition mode. The image dimension is 1920*1080, which indicates that the image is composed of 1920 pixels in a lateral direction (a horizontal direction) and 1080 pixels in a longitudinal direction (a vertical direction), that is, 2073600 pixels in total.

In the related art, after the surveillance camera is woken up based on the wake-up instruction sent by the detection sensor, the number of pixels of the image shot by the image sensor reaches 2 million, resulting in relatively large power consumption of the image sensor, such as tens of milliwatts (mW), so that the overall power consumption of the awakened surveillance camera increases. Therefore, in the case where the surveillance camera is directly awakened after an intrusion target is detected, the charge consumption of the battery of the surveillance camera is accelerated, the replacement frequency of the battery is increased, and there is also a case where the surveillance camera is woken up by mistake.

To reduce the charge consumption of the battery of the surveillance camera and reduce the replacement frequency of the battery, in the embodiment of the present application, the wake-up process of the surveillance camera is refined when the detection sensor detects the presence of an intrusion target in the surveilled region, which is implemented in the manners described below.

Manner one: when a micro control unit (MCU) is independently disposed in the surveillance camera, the wake-up instruction is first sent to the MCU by the detection sensor to wake up the MCU, and then the MCU controls the image sensor to start and enter the first image acquisition mode.

Manner two: when the MCU is disposed in the image sensor, in this embodiment, the wake-up instruction is sent to the image sensor by the detection sensor so that the awakened MCU in the image sensor controls the image sensor to enter the first image acquisition mode.

For example, as shown in FIG. 1(b), when the image sensor enters the first image acquisition mode, the image dimension corresponding to the first image acquisition mode is reduced from 1920*1080 of the normal image acquisition mode to 32*18.1920*1080 indicates that the image is composed of 1920 pixels in the lateral direction (the horizontal direction) and 1080 pixels in the longitudinal direction (the vertical direction), that is, 2073600 pixels in total; and 32*18 indicates that the image is composed of 32 pixels in the lateral direction (the horizontal direction) and 18 pixels in the longitudinal direction (the vertical direction), that is, 576 pixels in total.

When the MCU is a low-power device and the first image acquisition mode of the image sensor is also a low-power acquisition mode, the surveillance camera is avoided being woken up directly to acquire a surveillance image by the image sensor according to the normal image acquisition mode, resulting in that the overall power consumption of the surveillance camera is as high as hundreds of mW to several W. Thus, the image sensor is controlled to enter the low-power image mode based on the detection sensor, the power consumption of the image sensor is only 1-2 mW, thereby reducing the overall power consumption of the surveillance camera; moreover, the reduced overall power consumption of the surveillance camera is about several milliwatts to tens of milliwatts (mW), which is much less than the power consumption of directly waking up the surveillance camera, thereby effectively reducing the charge consumption of the battery of the surveillance camera and reducing the replacement frequency of the battery.

In S102, the image sensor in the first image acquisition mode is controlled to acquire at least two frames of surveillance images.

In an embodiment, to improve the wake-up accuracy of the surveillance camera, in this embodiment, after the image sensor is controlled to enter the first image acquisition mode, the image sensor in the first image acquisition mode is further controlled to acquire multiple frames of surveillance images according to a preset frame rate so that whether the intrusion target is a surveilled target is determined based on the acquired multiple frames of surveillance images. The first image acquisition mode is a low-power image acquisition mode; therefore, in the embodiment of the present application, the acquired multiple frames of surveillance images are grayscale images to reduce the consumption of the battery of the surveillance camera. The preset frame rate of the image sensor is determined according to the type or performance of the image sensor. For example, 30 frames of surveillance images are acquired in 1 second(s), that is, the frame rate is 30 fps; alternatively, 60 frames of surveillance images are acquired in 1 s, that is, the frame rate is 60 fps.

Exemplarily, after the image sensor in the first image acquisition mode acquires at least two frames of surveillance images, the image sensor sends the acquired at least two frames of surveillance images to the MCU to lay a foundation for the MCU to determine whether the intrusion target is a surveilled target based on the at least two frames of surveillance images.

In S103, whether the intrusion target is a surveilled target is determined according to the at least two frames of surveillance images.

The surveilled target refers to a pedestrian.

In an embodiment, after the at least two frames of surveillance images acquired by the image sensor in the first image acquisition mode are acquired, the MCU processes the at least two frames of surveillance images to determine whether the intrusion target is a surveilled target.

Exemplarily, the at least two frames of surveillance images are compared to determine the number of pixels occupied by the intrusion target present in the surveillance image, so as to determine whether the intrusion target is a surveilled target according to the number of pixels occupied by the intrusion target. It is to be noted that the implementation process of determining whether the intrusion target is a surveilled target in this embodiment is described in the following embodiment, which is not described too much here.

In S104, in the case where the intrusion target is a surveilled target, the image sensor is switched from the first image acquisition mode to a second image acquisition mode, and the image sensor in the second image acquisition mode is controlled to acquire a surveillance image having the surveilled target, where the second image acquisition mode is a normal image acquisition mode.

The number of pixels in the low-power image acquisition mode is less than the number of pixels in the normal image acquisition mode.

In an embodiment, if the MCU determines that the intrusion target is a surveilled target based on the at least two frames of surveillance images acquired by the image sensor, the detection sensor or the MCU sends the wake-up instruction to the surveillance camera in a sleep mode to wake up the surveillance camera, thereby improving the wake-up accuracy of the surveillance camera.

When the surveillance camera is woken up, the image sensor is also controlled to switch from the first image acquisition mode to the second image acquisition mode, and the image sensor in the second image acquisition mode is controlled to acquire the surveillance image having the surveilled target, so as to provide a basis for subsequent identification, accountability, finding or tracking of the surveilled target. For example, as shown in FIG. 1(c), the image sensor is switched from the first image acquisition mode to the second image acquisition mode. That is, the image sensor is switched from the low-power image acquisition mode to the normal image acquisition mode.

In the embodiment of the present application, when the detection sensor detects an intrusion target, the image sensor is controlled to enter the low-power image acquisition mode, and the image sensor in the low-power image acquisition mode is controlled to acquire multiple frames of surveillance images so that the MCU determines whether the intrusion target is a surveilled target based on the multiple frames of surveillance images acquired by the image sensor. The surveillance camera is not woken up until it is determined that the intrusion target is a surveilled target, thereby effectively avoiding a case where the surveillance camera is woken up by mistake and the charge consumption of the battery of the surveillance camera is increased since the intrusion target is not a surveilled target or when the intrusion target is a surveilled target but the surveilled target is wandering at an edge of the surveilled region.

In the technical scheme provided in the embodiment of the present application, when the detection sensor detects the presence of an intrusion target in the surveilled region, the image sensor is controlled to enter the first image acquisition mode, and the image sensor in the first image acquisition mode is controlled to acquire at least two frames of surveillance images, so as to determine whether the intrusion target in the at least two frames of surveillance images acquired by the image sensor is a surveilled target. When the intrusion target is a surveilled target, the image sensor is switched from the first image acquisition mode to the second image acquisition mode, and the image sensor in the second image acquisition mode is controlled to acquire the surveillance image having the surveilled target, that is, the surveillance camera is woken up. Therefore, the wake-up accuracy of the surveillance camera is improved, the charge consumption of the battery of the surveillance camera is reduced, the use time of the surveillance camera is prolonged, and the replacement frequency of the battery is reduced. In addition, the image sensor is controlled to acquire multiple frames of surveillance images of the surveilled target using the normal image acquisition mode to provide a favorable condition for subsequent identification, accountability, finding or tracking of the surveilled target.

Figure 2:
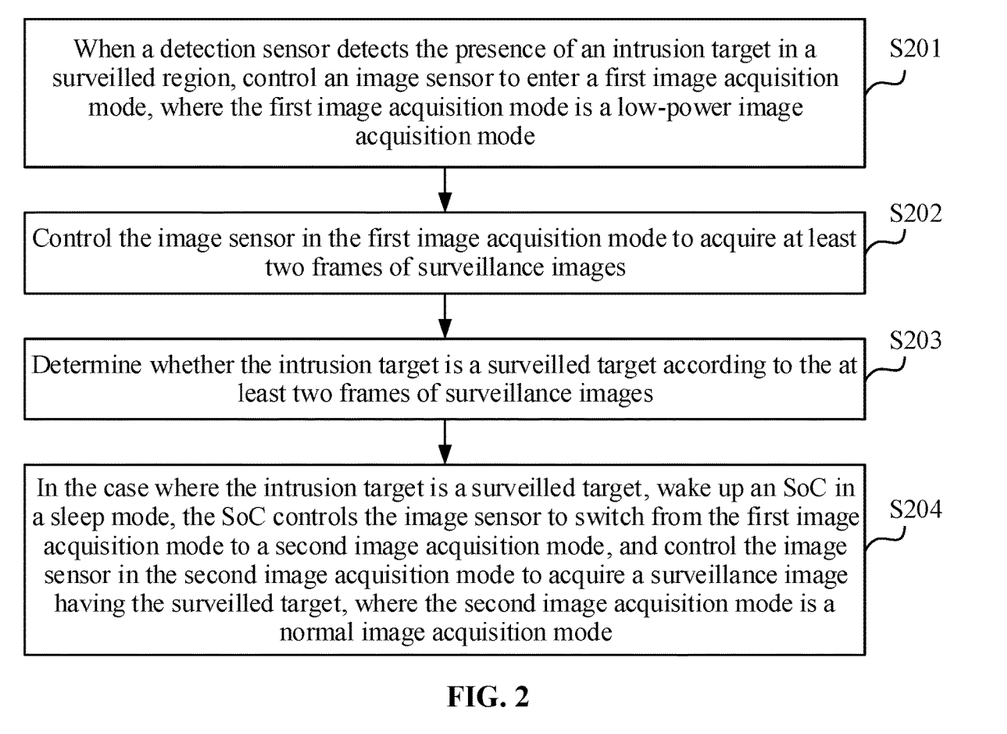
FIG. 2 is a flowchart of another wake-up method for a surveillance camera according to an embodiment of the present application.

FIG. 2 is a flowchart of another wake-up method for a surveillance camera according to an embodiment of the present application. This embodiment is refined on the basis of the preceding embodiment. Exemplarily, the surveillance camera further includes a system-on-chip (SoC). Therefore, in this embodiment, before the image sensor is switched from the first image acquisition mode to the second image acquisition mode and the image sensor in the second image acquisition mode is controlled to acquire the surveillance image having the surveilled target, the SoC needs to be woken up, and the SoC controls the image sensor to perform the image acquisition mode switching and image shooting. As shown in FIG. 2. the method includes S201 to S204.

In S201, when a detection sensor detects the presence of an intrusion target in a surveilled region, an image sensor is controlled to enter a first image acquisition mode, where the first image acquisition mode is a low-power image acquisition mode.

In S202, the image sensor in the first image acquisition mode is controlled to acquire at least two frames of surveillance images.

In S203, whether the intrusion target is a surveilled target is determined according to the at least two frames of surveillance images.

In S204, in the case where the intrusion target is a surveilled target, an SoC in a sleep mode is woken up, the image sensor is controlled by the SoC to switch from the first image acquisition mode to a second image acquisition mode, and the image sensor in the second image acquisition mode is controlled to acquire a surveillance image having the surveilled target, where the second image acquisition mode is a normal image acquisition mode.

Since the SoC belongs to a high-power device, based on the related art, the SoC in the sleep mode is directly woken up when an intrusion target is detected, resulting in accelerating the charge loss of a battery. Therefore, to reduce the charge consumption of the battery of the surveillance camera and reduce the replacement frequency of the battery, in the embodiment of the present application, the SoC is not woken up until the detection sensor detects the presence of an intrusion target in the surveilled region and it is determined that the intrusion target detected by the detection sensor is a surveilled target, which can not only improve the wake-up accuracy of the surveillance camera, but also enable the overall power consumption of the surveillance camera to be much less than the power consumption of directly waking up the SoC, thereby effectively reducing the charge consumption of the battery of the surveillance camera and reducing the replacement frequency of the battery.

Exemplarily, when it is determined that the intrusion target is a surveilled target, the detection sensor or an MCU sends a wake-up instruction to the SoC in the sleep mode in the surveillance camera to wake up the SoC in the surveillance camera. Then, an image acquisition mode switching instruction is sent to the image sensor by the SoC, the image sensor is controlled to switch from the first image acquisition mode to the second image acquisition mode, and the image sensor in the second image acquisition mode is controlled to acquire the surveillance image having the surveilled target.

In the technical scheme provided in the embodiment of the present application, when the detection sensor detects the presence of an intrusion target in the surveilled region, the image sensor is controlled to enter the first image acquisition mode, and the image sensor in the first image acquisition mode is controlled to acquire at least two frames of surveillance images, so as to determine whether the intrusion target in the at least two frames of surveillance images acquired by the image sensor is a surveilled target. When the intrusion target is a surveilled target, the SoC in the sleep mode is woken up, the image sensor is controlled by the SoC to switch from the first image acquisition mode to the second image acquisition mode, and the image sensor in the second image acquisition mode is controlled to acquire the surveillance image having the surveilled target. Therefore, the wake-up accuracy of the surveillance camera is improved, the charge consumption of the battery of the surveillance camera is reduced, the use time of the surveillance camera is prolonged, and the replacement frequency of the battery is reduced. In addition, after the SoC in the surveillance camera is woken up, the image sensor is controlled to perform the image acquisition mode switching and acquire multiple frames of surveillance images of the surveilled target using the normal image acquisition mode to provide a favorable condition for subsequent identification, accountability, finding or tracking of the surveilled target.

Figure 3:
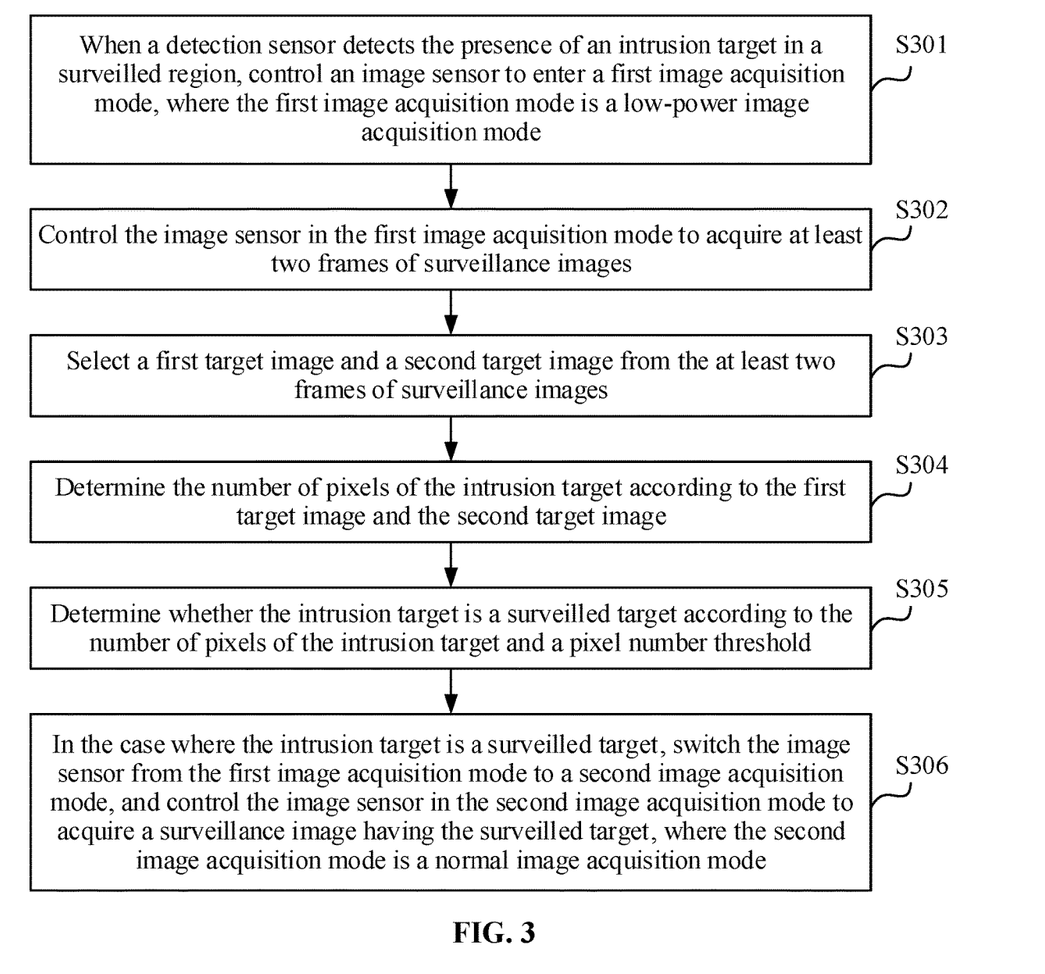
FIG. 3 is a flowchart of another wake-up method for a surveillance camera according to an embodiment of the present application.

FIG. 3 is a flowchart of another wake-up method for a surveillance camera according to an embodiment of the present application. In this embodiment, on the basis of the preceding embodiment, it is refined that whether the intrusion target is a surveilled target is determined according to the at least two frames of surveillance images. As shown in FIG. 3, the method includes S301 to S306.

In S301, when a detection sensor detects the presence of an intrusion target in a surveilled region, an image sensor is controlled to enter a first image acquisition mode, where the first image acquisition mode is a low-power image acquisition mode.

In S302, the image sensor in the first image acquisition mode is controlled to acquire at least two frames of surveillance images.

In S303, a first target image and a second target image are selected from the at least two frames of surveillance images.

In an embodiment, two frames of surveillance images are randomly selected from the at least two frames of surveillance images by an MCU as the first target image and the second target image. In an embodiment, to improve the accuracy of subsequently determining whether the intrusion target is a surveilled target, in the embodiment of the present application, a first frame of surveillance image is selected from the at least two frames of surveillance images as the first target image, and another frame of surveillance image is selected as the second target image according to a preset interval. The preset interval is set according to an actual need, for example, an interval of one frame, an interval of two frames, an interval of five frames or an interval of zero frames, which is not limited here.

For example, assuming that a frame rate of the image sensor is 30 fps and the preset interval is an interval of two frames, the MCU selects a first frame of surveillance image as the first target image and select a fourth frame of surveillance image as the second target image from the 30 frames of surveillance images acquired by the image sensor.

For another example, assuming that the frame rate of the image sensor is 30 fps and the preset interval is an interval of zero frames, the MCU selects a first frame of surveillance image as the first target image and select a second frame of surveillance image as the second target image from the 30 frames of surveillance images acquired by the image sensor.

In S304, the number of pixels of the intrusion target is determined according to the first target image and the second target image.

In the embodiment of the present application, after the first target image and the second target image are acquired, the MCU processes the first target image and the second target image in different manners to determine the number of the pixels of the intrusion target. In an embodiment, a difference between the first target image and the second target image is calculated to obtain a difference image. Then, the number of the pixels occupied by the intrusion target is determined based on the difference image. Exemplarily, spatially consecutive pixels whose pixel value is a first numerical value in the difference image are determined, and the number of the pixels of the intrusion target is determined according to the number of the spatially consecutive pixels. The number of the spatially consecutive pixels is the number of the pixels of the intrusion target. In this embodiment, when the number of the pixels of the intrusion target is determined, the following conditions need to be met: in condition one, the pixel value of the pixel is the first numerical value; and in condition two, the pixel whose pixel value is a first numerical value needs to be a spatially continuous pixel. Based on the above two conditions, the misidentification of the intrusion target is avoided due to the fact that the pixel value is the first numerical value but the pixel is a spatially discrete pixel, thereby improving the identification accuracy of the intrusion target.

The number of the pixels of the intrusion target in this embodiment is determined by the MCU. The first numerical value is any one of the numerical values among (0, 255), for example, 0, 255 or the like, which is not limited here.

In S305, whether the intrusion target is a surveilled target is determined according to the number of the pixels of the intrusion target and a pixel number threshold.

The pixel number threshold is set according to an actual need, for example, 18 pixels, 20 pixels or the like, which is not limited here.

In an embodiment, the MCU acquires a preset pixel number threshold, compare the number of the pixels of the intrusion target with the pixel number threshold and determine whether the intrusion target is a surveilled target according to a comparison result. If the number of the pixels of the intrusion target is greater than the pixel number threshold, it is determined that the intrusion target is a surveilled target. If the number of the pixels of the intrusion target is less than or equal to the pixel number threshold, it is determined that the intrusion target is not a surveilled target.

Since the intrusion target detected by the detection sensor is located in any sub-region of the surveilled region, for example, in a sub-region that is close to the surveillance camera in the surveilled region, or in a sub-region that is far away from the surveillance camera in the surveilled region (for example, in the vicinity of a farthest boundary of the surveilled region), in this case, an error may occur in determining whether the intrusion target is a surveilled target using a preset fixed pixel number threshold. Therefore, in this embodiment, the pixel number threshold is controlled, and the pixel number threshold is dynamically determined according to a distance between the sub-region where the intrusion target is located in the surveilled region and the surveillance camera. For example, when the intrusion target is located in the sub-region that is close to the surveillance camera in the surveilled region, the pixel number threshold is set to be relatively large; when the intrusion target is located in the sub-region that is far away from the surveillance camera in the surveilled region, the pixel number threshold is set to be relatively small, so as to meet a need to determine whether the intrusion target located in different sub-regions is a surveilled target, thereby avoiding the misidentification of the intrusion target.

In the embodiment of the present application, the surveillance camera further includes a distance sensor so that the distance sensor is controlled to acquire a distance between the intrusion target and the surveillance camera in each frame of surveillance image while the image sensor in the first image acquisition mode is controlled to acquire at least two frames of surveillance images, and when the MCU determines whether the intrusion target is a surveilled target, the MCU determines whether the intrusion target is a surveilled target according to the first target image and the second target image acquired by the image sensor and the distance between the intrusion target and the surveillance camera in the each frame of surveillance image, thereby improving the identification accuracy of the intrusion target.

Exemplarily, the operation in which whether the intrusion target is a surveilled target is determined according to the first target image and the second target image acquired by the image sensor and the distance between the intrusion target and the surveillance camera in each frame of surveillance image includes the following: the number of the pixels of the intrusion target and the sub-region where the intrusion target is located is determined based on the first target image and the second target image, weighted averaging is separately performed on a distance between the intrusion target and the surveillance camera in the first target image and a distance between the intrusion target and the surveillance camera in the second target image to obtain an average value of distance, and the average value of distance is used as a final distance between the intrusion target and the surveillance camera to determine the pixel number threshold according to the final distance, and then, whether the intrusion target is a surveilled target is determined according to the pixel number threshold and the number of the pixels of the intrusion target.

It is to be noted that when the detection sensor detects that multiple intrusion targets intrude into the surveilled region, in this embodiment, a distance between an intrusion target closest to the surveillance camera and the surveillance camera is acquired by the distance sensor, and whether the intrusion target is a surveilled target is determined according to the distance and a first target image and a second target image each having the intrusion target.

Alternatively, a distance between each intrusion target and the surveillance camera is acquired by the distance sensor to determine whether the each intrusion target is a surveilled target according to the distance between the each intrusion target and the surveillance camera and a first target image and a second target image corresponding to the each intrusion target.

In S306, in the case where the intrusion target is a surveilled target, the image sensor is switched from the first image acquisition mode to a second image acquisition mode, and the image sensor in the second image acquisition mode is controlled to acquire a surveillance image having the surveilled target, where the second image acquisition mode is a normal image acquisition mode.

In the technical scheme provided in the embodiment of the present application, when the detection sensor detects the presence of an intrusion target in the surveilled region, the image sensor is controlled to enter the first image acquisition mode, and the image sensor in the first image acquisition mode is controlled to acquire at least two frames of surveillance images, so as to determine whether the intrusion target in the at least two frames of surveillance images acquired by the image sensor is a surveilled target. When the intrusion target is a surveilled target, the image sensor is switched from the first image acquisition mode to the second image acquisition mode, and the image sensor in the second image acquisition mode is controlled to acquire the surveillance image having the surveilled target, that is, the surveillance camera is woken up. Therefore, the wake-up accuracy of the surveillance camera is improved, the charge consumption of a battery of the surveillance camera is reduced, the use time of the surveillance camera is prolonged, and the replacement frequency of the battery is reduced. In addition, in the embodiment of the present application, the pixel number threshold is dynamically adjusted according to the sub-region where the intrusion target is located in the surveilled region, improving the accuracy of identifying whether the intrusion target is a surveilled target and reducing a misidentification rate of the intrusion target.

Figure 4:
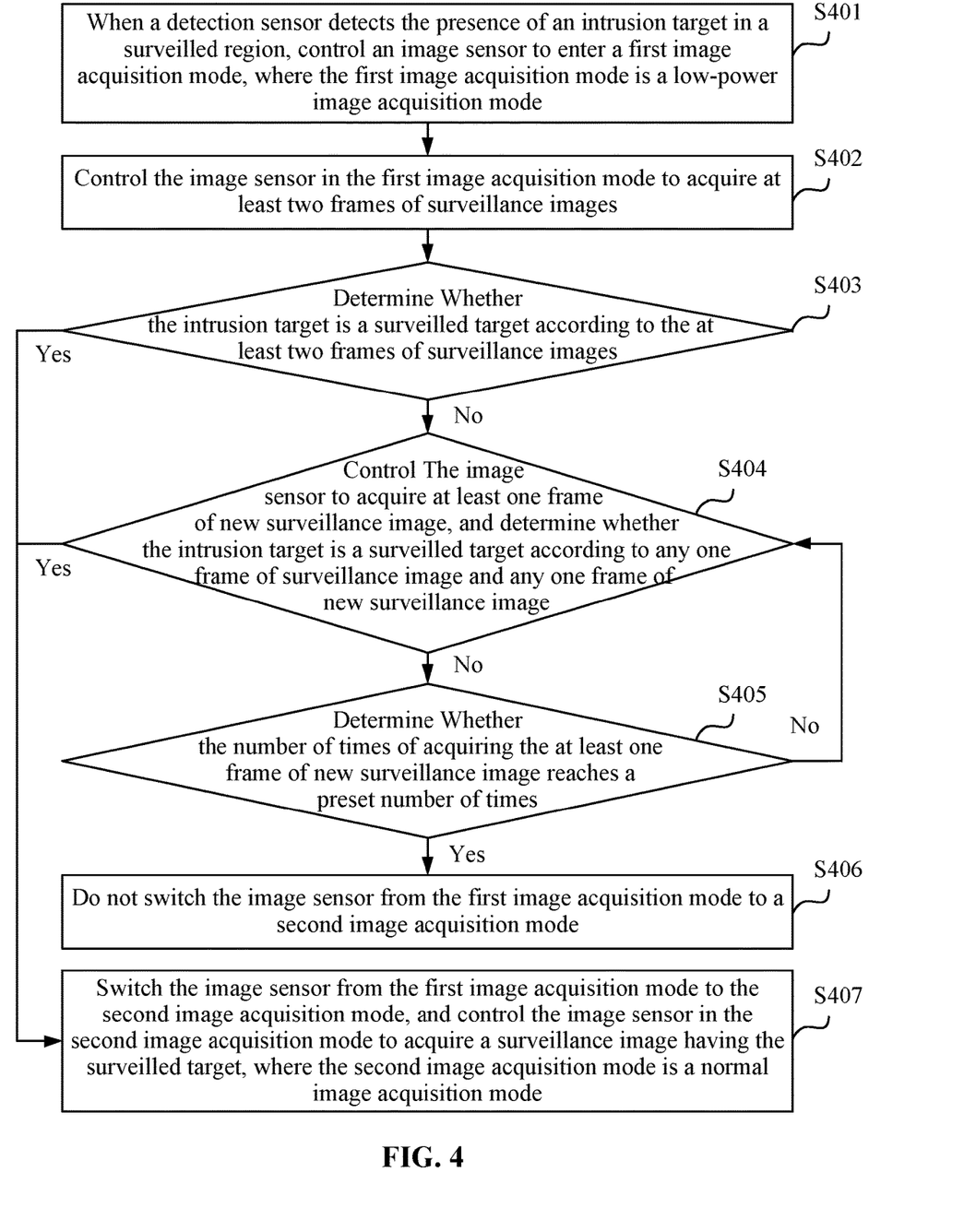
FIG. 4 is a flowchart of another wake-up method for a surveillance camera according to an embodiment of the present application.

FIG. 4 is a flowchart of another wake-up method for a surveillance camera according to an embodiment of the present application. This embodiment is refined on the basis of the preceding embodiment. As shown in FIG. 4, the method includes S401 to S407.

In S401, when a detection sensor detects the presence of an intrusion target in a surveilled region, an image sensor is controlled to enter a first image acquisition mode, where the first image acquisition mode is a low-power image acquisition mode.

In S402, the image sensor in the first image acquisition mode is controlled to acquire at least two frames of surveillance images.

In S403, whether the intrusion target is a surveilled target is determined according to the at least two frames of surveillance images. In the case where the intrusion target is not a surveilled target, S404 is performed, and in the case where the intrusion target is a surveilled target, S407 is performed.

In S404, the image sensor is controlled to acquire at least one frame of new surveillance image, and whether the intrusion target is a surveilled target is determined according to any one of the at least two frames of surveillance images and any one of the at least one frame of new surveillance image. In the case where it is determined that the intrusion target is not a surveilled target, S405 is performed, and in the case where it is determined that the intrusion target is a surveilled target, S407 is performed.

In an embodiment, after the image sensor is controlled to acquire at least one frame of new surveillance image, any one frame of new surveillance image is selected from the at least one frame of new surveillance image, and any one frame of surveillance image is selected from the at least two frames of surveillance images. Then, whether the intrusion target is a surveilled target is determined according to the selected one frame of new surveillance image and the selected one frame of surveillance image. In an embodiment of the present application, when any one frame of surveillance image is selected from the at least two frames of surveillance images, a first frame of surveillance image is selected so that an initial first frame of surveillance image is used as a determination standard to determine whether the intrusion target is a surveilled target, which can avoid an interference factor brought by a non-first frame of surveillance image and improve the identification accuracy of the intrusion target.

It is to be noted that in this embodiment, the implementation principle of determining whether the intrusion target is a surveilled target according to the selected one frame of new surveillance image and the selected one frame of surveillance image is the same as or similar to the process of determining whether the intrusion target is a surveilled target in the preceding embodiment, and reference is made to the preceding embodiment, which is not described too much here.

In S405, whether the number of times of acquiring the at least one frame of new surveillance image reaches a preset number of times is determined.

In S406, in the case where the number of times of acquiring the at least one frame of new surveillance image reaches the preset number of times, the image sensor is not switched from the first image acquisition mode to a second image acquisition mode. In the case where the number of times of acquiring the at least one frame of new surveillance image is less than the preset number of times, the above S404 is returned and performed.

The preset number of times is set according to an actual need, for example, two times, three times, four times or the like, which is not limited here.

When it is determined that the intrusion target is not a surveilled target according to the at least two frames of surveillance images, in this embodiment, at least one frame of new surveillance image is also acquired by the image sensor in the first image acquisition mode, and whether the intrusion target is a surveilled target is determined again using any one of the at least one frame of new surveillance image and any one of the at least two frames of surveillance images, so as to reduce a misidentification rate of the intrusion target. To reduce the charge consumption of a battery of the surveillance camera, in the embodiment of the present application, the number of times of reacquiring the new surveillance image is also counted. When the number of times of acquiring at least one frame of new surveillance image by the image sensor reaches the preset number of times, it is considered that the intrusion target is not a surveilled target, and the image sensor is not switched from the first image acquisition mode to the second image acquisition mode, so as to avoid an unnecessary wake-up operation of the surveillance camera and reduce the use of the charge of the battery.

In S407, the image sensor is switched from the first image acquisition mode to the second image acquisition mode, and the image sensor in the second image acquisition mode is controlled to acquire a surveillance image having the surveilled target, where the second image acquisition mode is a normal image acquisition mode.

When S407 is performed, the number of times of acquiring at least one frame of new surveillance image by the image sensor is also zeroed out to reduce a subsequent adverse effect on the surveillance camera.

In the technical scheme provided in the embodiment of the present application, when it is determined that the intrusion target is not a surveilled target according to the at least two frames of surveillance images acquired by the image sensor in the first image acquisition mode, the image sensor is controlled to acquire at least one frame of new surveillance image, and any one of the at least one frame of new surveillance image and any one of the at least two frames of surveillance images are selected to determine whether the intrusion target is a surveilled target again. If it is determined that the intrusion target is not a surveilled target and the number of times of acquiring the new surveillance image reaches the preset number of times, the image sensor is not switched from the first image acquisition mode to the second image acquisition mode. If it is determined that the intrusion target is a surveilled target, the image sensor is switched from the first image acquisition mode to the second image acquisition mode, and the image sensor in the second image acquisition mode is controlled to acquire the surveillance image having the surveilled target, where the second image acquisition mode is the normal image acquisition mode. Therefore, not only is the wake-up accuracy of the surveillance camera improved, but the charge consumption of the battery of the surveillance camera can also be reduced, the use time of the surveillance camera is prolonged, and the replacement frequency of the battery is reduced.

Figure 5:
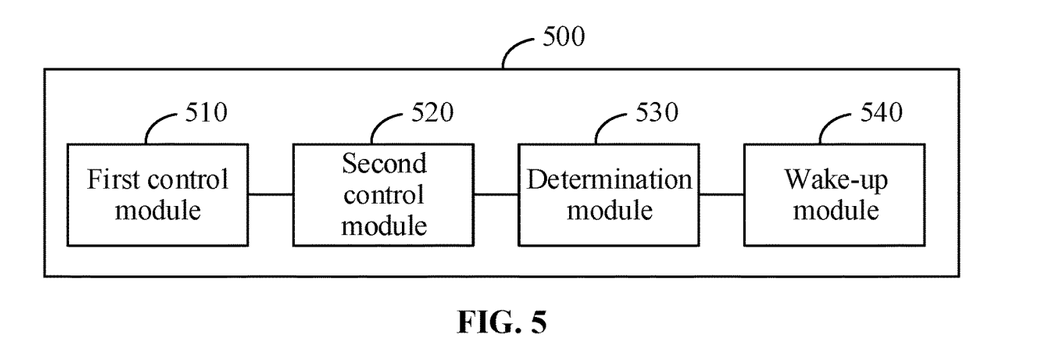
FIG. 5 is a structure diagram of a wake-up device for a surveillance camera according to an embodiment of the present application.

FIG. 5 is a structure diagram of a wake-up device for a surveillance camera according to an embodiment of the present application. The wake-up device for a surveillance camera is disposed in a surveillance camera including a detection sensor and an image sensor. As shown in FIG. 5, a wake-up device 500 for a surveillance camera provided in the embodiment of the present application includes a first control module 510, a second control module 520, a determination module 530 and a wake-up module 540.

The first control module 510 is configured to control, when the detection sensor detects the presence of an intrusion target in a surveilled region, the image sensor to enter a first image acquisition mode, where the first image acquisition mode is a low-power image acquisition mode.

The second control module 520 is configured to control the image sensor in the first image acquisition mode to acquire at least two frames of surveillance images.

The determination module 530 is configured to determine whether the intrusion target is a surveilled target according to the at least two frames of surveillance images.

The wake-up module 540 is configured to switch, in the case where the intrusion target is a surveilled target, the image sensor from the first image acquisition mode to a second image acquisition mode, and control the image sensor in the second image acquisition mode to acquire a surveillance image having the surveilled target, where the second image acquisition mode is a normal image acquisition mode.

As an optional implementation of the embodiment of the present application, the surveillance camera further includes an SoC.

The wake-up module 540 is configured to wake up, in the case where the intrusion target is a surveilled target, the SoC in a sleep mode, control the image sensor by the SoC to switch from the first image acquisition mode to the second image acquisition mode, and control the image sensor in the second image acquisition mode to acquire the surveillance image having the surveilled target.

As an optional implementation of the embodiment of the present application, the determination module 530 includes an image selection unit, a pixel number determination unit and a surveilled target determination unit.

The image selection unit is configured to select a first target image and a second target image from the at least two frames of surveillance images.

The pixel number determination unit is configured to determine the number of pixels of the intrusion target according to the first target image and the second target image.

The surveilled target determination unit is configured to determine whether the intrusion target is a surveilled target according to the number of pixels of the intrusion target and a pixel number threshold.

As an optional implementation of the embodiment of the present application, the pixel number determination unit is configured to calculate a difference between the first target image and the second target image to obtain a difference image, determine spatially consecutive pixels whose pixel value is a first numerical value in the difference image, and determine the number of pixels of the intrusion target according to the number of the spatially consecutive pixels.

As an optional implementation of the embodiment of the present application, the surveilled target determination unit is configured to determine that the intrusion target is a surveilled target if the number of the pixels of the intrusion target is greater than the pixel number threshold, and determine that the intrusion target is not a surveilled target if the number of the pixels of the intrusion target is less than or equal to the pixel number threshold.

As an optional implementation of the embodiment of the present application, the device 500 further includes a processing module and a fourth control module.

The processing module is configured to control, in the case where the intrusion target is not a surveilled target, the image sensor to acquire at least one frame of new surveillance image, and determine whether the intrusion target is a surveilled target according to any one of the at least two frames of surveillance images and any one of the at least one frame of new surveillance image.

The fourth control module is configured to not switch the image sensor from the first image acquisition mode to the second image acquisition mode in the case where the intrusion target is not a surveilled target and the number of times of acquiring the at least one frame of new surveillance image reaches a preset number of times.

As an optional implementation of the embodiment of the present application, the number of pixels in the low-power image acquisition mode is less than the number of pixels in the normal image acquisition mode.

The at least two frames of surveillance images or the at least one frame of new surveillance image acquired by the image sensor are grayscale images.

It is to be noted that the above explanation of the embodiment of the wake-up method for a surveillance camera is also applicable to the wake-up device for a surveillance camera of this embodiment, and the implementation principle of the wake-up method for a surveillance camera is similar to that of the wake-up device for a surveillance camera, which are not repeated here.

In the technical scheme provided in the embodiment of the present application, when the detection sensor detects the presence of an intrusion target in the surveilled region, the image sensor is controlled to enter the first image acquisition mode, and the image sensor in the first image acquisition mode is controlled to acquire at least two frames of surveillance images, so as to determine whether the intrusion target in the at least two frames of surveillance images acquired by the image sensor is a surveilled target. When the intrusion target is a surveilled target, the image sensor is switched from the first image acquisition mode to the second image acquisition mode, and the image sensor in the second image acquisition mode is controlled to acquire the surveillance image having the surveilled target, that is, the surveillance camera is woken up. Therefore, the wake-up accuracy of the surveillance camera is improved, the charge consumption of a battery of the surveillance camera is reduced, the use time of the surveillance camera is prolonged, and the replacement frequency of the battery is reduced.

Figure 6:
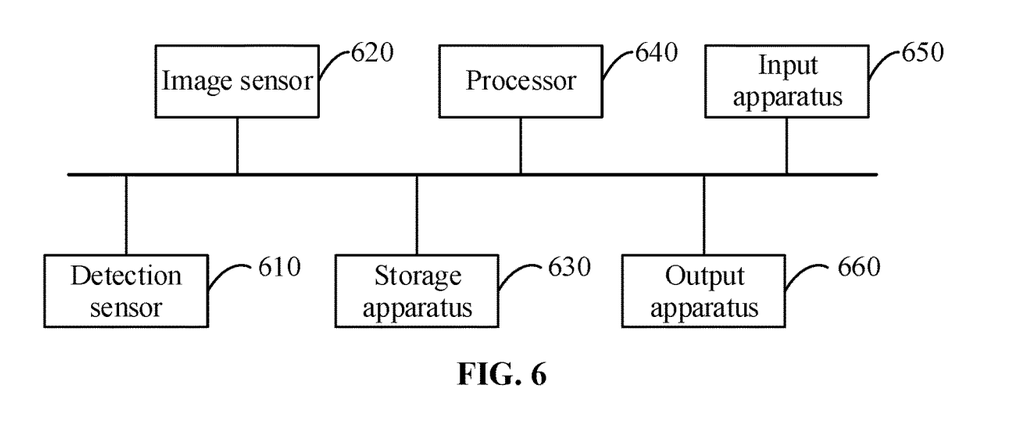
FIG. 6 is a structure diagram of a surveillance camera according to an embodiment of the present application.

FIG. 6 is a structure diagram of a surveillance camera according to an embodiment of the present application. As shown in FIG. 7, the surveillance camera includes a detection sensor 610, an image sensor 620, a storage apparatus 630, a processor 640, an input apparatus 650 and an output apparatus 660, where the detection sensor 610 is configured to detect whether an intrusion target is present in a surveilled region, and the image sensor 620 is configured to acquire a surveillance image of the surveilled region. In FIG. 6, one processor 640 is used as an example. The detection sensor 610, the image sensor 620, the storage apparatus 630, the processor 640, the input apparatus 650 and the output apparatus 660 in the surveillance camera is connected via a bus or in other manners. In FIG. 6, being connected via a bus is used as an example.

The storage apparatus 630, as a computer-readable storage medium, is configured to store software programs, computer-executable programs and modules, such as program instructions/modules corresponding to the wake-up method for a surveillance camera in the embodiment of the present application (such as the first control module 510, the second control module 520, the determination module 530 and the wake-up module 540 in the wake-up device 500 for a surveillance camera). The processor 640 executes software programs, instructions and modules stored in the storage apparatus 630 to perform various functional applications and data processing of the computer, that is, implements the preceding wake-up method for a surveillance camera, which includes the steps described below.

When the detection sensor detects the presence of an intrusion target in a surveilled region, the image sensor is controlled to enter a first image acquisition mode, where the first image acquisition mode is a low-power image acquisition mode.

The image sensor in the first image acquisition mode is controlled to acquire at least two frames of surveillance images.

Whether the intrusion target is a surveilled target is determined according to the at least two frames of surveillance images.

In the case where the intrusion target is a surveilled target, the image sensor is switched from the first image acquisition mode to a second image acquisition mode, and the image sensor in the second image acquisition mode is controlled to acquire a surveillance image having the surveilled target, where the second image acquisition mode is a normal image acquisition mode.

Of course, the surveillance camera provided in the embodiment of the present application is not limited to the operations of the above method. The related operations of the wake-up method for a surveillance camera provided in any other embodiment of the present application is also performed.

The storage apparatus 630 mainly includes a program storage region and a data storage region. The program storage region stores an operating system and an application program required for implementing at least one function while the data storage region stores data created depending on use of terminals. Additionally, the storage apparatus 630 includes a high-speed random-access memory and also includes a non-volatile memory, such as at least one magnetic disk memory, a flash memory or another non-volatile solid-state memory. In some examples, the storage apparatus 630 includes storage apparatuses which are remotely disposed relative to the processor 640 and these remote storage apparatuses are connected to the surveillance camera via a network. Examples of the preceding network include, but are not limited to, the Internet, an intranet, a local area network, a mobile communication network and a combination thereof.

The input apparatus 650 is configured to receive input digital or character information and generate key signal input related to user settings and function control of the surveillance camera. The output apparatus 660 is configured to output the acquired surveillance images to a display device such as a display screen.

For the surveillance camera provided in the embodiment of the present application, when the detection sensor detects the presence of an intrusion target in the surveilled region, the image sensor is controlled to enter the first image acquisition mode, and the image sensor in the first image acquisition mode is controlled to acquire at least two frames of surveillance images, so as to determine whether the intrusion target in the at least two frames of surveillance images acquired by the image sensor is a surveilled target. When the intrusion target is a surveilled target, the image sensor is switched from the first image acquisition mode to the second image acquisition mode, and the image sensor in the second image acquisition mode is controlled to acquire the surveillance image having the surveilled target, that is, to wake up the surveillance camera. Therefore, the wake-up accuracy of the surveillance camera is improved, the charge consumption of a battery of the surveillance camera is reduced, the use time of the surveillance camera is prolonged, and the replacement frequency of the battery is reduced.

The present application further provides a computer-readable storage medium.

The computer-readable storage medium provided in an embodiment of the present application on which a computer program is stored, where the program, when executed by a processor, implements the wake-up method for a surveillance camera according to the embodiment of the present application, which is performed by a surveillance camera. The surveillance camera includes a detection sensor and an image sensor, and the method includes the steps described below.

When the detection sensor detects the presence of an intrusion target in a surveilled region, the image sensor is controlled to enter a first image acquisition mode, where the first image acquisition mode is a low-power image acquisition mode.

The image sensor in the first image acquisition mode is controlled to acquire at least two frames of surveillance images.

Whether the intrusion target is a surveilled target is determined according to the at least two frames of surveillance images.

In the case where the intrusion target is a surveilled target, the image sensor is switched from the first image acquisition mode to a second image acquisition mode, and the image sensor in the second image acquisition mode is controlled to acquire a surveillance image having the surveilled target, where the second image acquisition mode is a normal image acquisition mode.

The computer storage medium in the embodiments of the present application uses any combination of at least one computer-readable medium. The computer-readable medium is a computer-readable signal medium or a computer-readable storage medium. The computer-readable storage medium may be, but is not limited to, an electrical, magnetic, optical, electromagnetic, infrared or semiconductor system, apparatus or device, or any combination thereof. More specific examples of the computer-readable storage medium include (non-exhaustive list): an electrical connection having at least one wire, a portable computer magnetic disk, a hard disk, a random-access memory (RAM), a read-only memory (ROM), an erasable programmable read-only memory (EPROM) or flash memory, an optical fiber, a portable compact disc read-only memory (CD-ROM), an optical memory device, a magnetic memory device or any suitable combination thereof. In this document, the computer-readable storage medium is any tangible medium including or storing a program. The program is used by or used in conjunction with an instruction execution system, apparatus or device.

A computer-readable signal medium includes a data signal propagated in a baseband or as part of a carrier. Computer-readable program codes are carried in the data signal. The data signal propagated in this manner is in multiple forms and includes, but is not limited to, an electromagnetic signal, an optical signal or any suitable combination thereof. The computer-readable signal medium is also any computer-readable medium except the computer-readable storage medium. The computer-readable medium sends, propagates or transmits a program used by or used in conjunction with an instruction execution system, apparatus or device.

The program codes contained on the computer-readable medium are transmitted on any suitable medium, including, but not limited to, the wireless, a wire, an optical cable, a radio frequency (RF) or any suitable combination thereof.

Computer program codes for performing the operations of the present application are written in at least one programming language or a combination thereof, the at least one programming language including object-oriented programming languages such as Java, Smalltalk, C++ and further including conventional procedural programming languages such as C programming language or similar programming languages. Program codes are executed entirely on a client computer, executed partly on a client computer, executed as a stand-alone software package, executed partly on a client computer and partly on a remote computer, or executed entirely on a remote computer or a server. In the case relating to the remote computer, the remote computer is connected to the client computer via any kind of network including a local area network (LAN) or a wide area network (WAN), or connected to an external computer (for example, via the Internet through an Internet service provider).

What is claimed is:

1. A wake-up method for a surveillance camera, which is executed by a surveillance camera comprising a detection sensor and an image sensor, comprising:
   in response to the detection sensor detecting presence of an intrusion target in a surveilled region, controlling the image sensor to enter a first image acquisition mode, wherein the first image acquisition mode is a low-power image acquisition mode;
   controlling the image sensor in the first image acquisition mode to acquire at least two frames of surveillance images;
   determining whether the intrusion target is a surveilled target according to the at least two frames of surveillance images; and
   in response to determining that the intrusion target is a surveilled target, switching the image sensor from the first image acquisition mode to a second image acquisition mode, and controlling the image sensor in the second image acquisition mode to acquire a surveillance image having the surveilled target, wherein the second image acquisition mode is a normal image acquisition mode;
   wherein determining whether the intrusion target is a surveilled target according to the at least two frames of surveillance images comprises:
   selecting a first target image and a second target image from the at least two frames of surveillance images;
   determining a number of pixels of the intrusion target according to the first target image and the second target image; and
   determining whether the intrusion target is a surveilled target according to the number of the pixels of the intrusion target and a pixel number threshold.

2. The method according to claim 1, wherein the surveillance camera further comprises a system-on-chip (SoC); and
   wherein in response to determining that the intrusion target is a surveilled target, switching the image sensor from the first image acquisition mode to the second image acquisition mode, and controlling the image sensor in the second image acquisition mode to acquire the surveillance image having the surveilled target comprises:
   in response to determining that the intrusion target is a surveilled target, waking up the SoC in a sleep mode, controlling, by the SoC, the image sensor to switch from the first image acquisition mode to the second image acquisition mode, and controlling, by the SoC, the image sensor in the second image acquisition mode to acquire the surveillance image having the surveilled target.

3. The method according to claim 1, wherein determining the number of the pixels of the intrusion target according to the first target image and the second target image comprises:
   calculating a difference between the first target image and the second target image to obtain a difference image;
   determining spatially consecutive pixels whose pixel value is a first numerical value in the difference image; and
   determining the number of the pixels of the intrusion target according to a number of the spatially consecutive pixels.

4. The method according to claim 1, wherein determining whether the intrusion target is a surveilled target according to the number of the pixels of the intrusion target and the pixel number threshold comprises:
   in response to the number of the pixels of the intrusion target being greater than the pixel number threshold, determining that the intrusion target is a surveilled target; or
   in response to the number of the pixels of the intrusion target being less than or equal to the pixel number threshold, determining that the intrusion target is not a surveilled target.

5. The method according to claim 1, after determining whether the intrusion target is a surveilled target according to the at least two frames of surveillance images, further comprising:
   in response to determining that the intrusion target is not a surveilled target, controlling the image sensor to acquire at least one frame of new surveillance image, and determining whether the intrusion target is a surveilled target according to one of the at least two frames of surveillance images and one of the at least one frame of new surveillance image; and
   in response to determining that the intrusion target is not a surveilled target according to one of the at least two frames of surveillance images and one of the at least one frame of new surveillance image, and that a number of times of acquiring the at least one frame of new surveillance image reaches a preset number of times, not switching the image sensor from the first image acquisition mode to the second image acquisition mode.

6. The method according to claim 5, wherein a number of pixels in the low-power image acquisition mode is less than a number of pixels in the normal image acquisition mode; and the at least two frames of surveillance images acquired by the image sensor are grayscale images or the at least one frame of new surveillance image acquired by the image sensor is a grayscale image.

7. A surveillance camera, comprising:
a detection sensor, which is configured to detect whether an intrusion target is present in a surveilled region;
an image sensor, which is configured to acquire a surveillance image of the surveilled region;
at least one processor; and
a storage apparatus, which is configured to store at least one program,
wherein the at least one program, when executed by the at least one processor, causes the at least one processor to implement:
in response to the detection sensor detecting presence of an intrusion target in a surveilled region, controlling the image sensor to enter a first image acquisition mode, wherein the first image acquisition mode is a low-power image acquisition mode;
controlling the image sensor in the first image acquisition mode to acquire at least two frames of surveillance images;
determining whether the intrusion target is a surveilled target according to the at least two frames of surveillance images; and
in response to determining that the intrusion target is a surveilled target, switching the image sensor from the first image acquisition mode to a second image acquisition mode, and controlling the image sensor in the second image acquisition mode to acquire a surveillance image having the surveilled target, wherein the second image acquisition mode is a normal image acquisition mode;
wherein the at least one program, when executed by the at least one processor, causes the at least one processor to implement determining whether the intrusion target is a surveilled target according to the at least two frames of surveillance images in the following way:
selecting a first target image and a second target image from the at least two frames of surveillance images;
determining a number of pixels of the intrusion target according to the first target image and the second target image; and
determining whether the intrusion target is a surveilled target according to the number of the pixels of the intrusion target and a pixel number threshold.

8. The surveillance camera according to claim 7, wherein the surveillance camera further comprises a system-on-chip (SoC); and wherein the at least one program, when executed by the at least one processor, causes the at least one processor to implement in response to determining that the intrusion target is a surveilled target, switching the image sensor from the first image acquisition mode to the second image acquisition mode, and controlling the image sensor in the second image acquisition mode to acquire the surveillance image having the surveilled target in the following way:
in response to determining that the intrusion target is a surveilled target, waking up the SoC in a sleep mode, controlling, by the SoC, the image sensor to switch from the first image acquisition mode to the second image acquisition mode, and controlling, by the SoC, the image sensor in the second image acquisition mode to acquire the surveillance image having the surveilled target.

9. The surveillance camera according to claim 7, wherein the at least one program, when executed by the at least one processor, causes the at least one processor to implement determining the number of the pixels of the intrusion target according to the first target image and the second target image in the following way:
calculating a difference between the first target image and the second target image to obtain a difference image;
determining spatially consecutive pixels whose pixel value is a first numerical value in the difference image; and
determining the number of the pixels of the intrusion target according to a number of the spatially consecutive pixels.

10. The surveillance camera according to claim 7, wherein the at least one program, when executed by the at least one processor, causes the at least one processor to implement determining whether the intrusion target is a surveilled target according to the number of the pixels of the intrusion target and the pixel number threshold in the following way:
in response to the number of the pixels of the intrusion target being greater than the pixel number threshold, determining that the intrusion target is a surveilled target; or
in response to the number of the pixels of the intrusion target being less than or equal to the pixel number threshold, determining that the intrusion target is not a surveilled target.

11. The surveillance camera according to claim 7, wherein the at least one program, when executed by the at least one processor, causes the at least one processor to, after determining whether the intrusion target is a surveilled target according to the at least two frames of surveillance images, further implement:
in response to determining that the intrusion target is not a surveilled target, controlling the image sensor to acquire at least one frame of new surveillance image, and determining whether the intrusion target is a surveilled target according to one of the at least two frames of surveillance images and one of the at least one frame of new surveillance image; and
in response to determining that the intrusion target is not a surveilled target according to one of the at least two frames of surveillance images and one of the at least one frame of new surveillance image, and that a number of times of acquiring the at least one frame of new surveillance image reaches a preset number of times, not switching the image sensor from the first image acquisition mode to the second image acquisition mode.

12. The surveillance camera according to claim 11, wherein a number of pixels in the low-power image acquisition mode is less than a number of pixels in the normal image acquisition mode; and
the at least two frames of surveillance images acquired by the image sensor are grayscale images or the at least one frame of new surveillance image acquired by the image sensor is a grayscale image.

13. A non-transitory computer-readable storage medium on which a computer program is stored, wherein the computer program, when executed by a processor, implements:
in response to a detection sensor detecting presence of an intrusion target in a surveilled region, controlling an image sensor to enter a first image acquisition mode, wherein the first image acquisition mode is a low-power image acquisition mode;

controlling the image sensor in the first image acquisition mode to acquire at least two frames of surveillance images;

determining whether the intrusion target is a surveilled target according to the at least two frames of surveillance images; and in response to determining that the intrusion target is a surveilled target, switching the image sensor from the first image acquisition mode to a second image acquisition mode, and controlling the image sensor in the second image acquisition mode to acquire a surveillance image having the surveilled target, wherein the second image acquisition mode is a normal image acquisition mode;

wherein the computer program, when executed by the processor, implements determining whether the intrusion target is a surveilled target according to the at least two frames of surveillance images in the following way:

selecting a first target image and a second target image from the at least two frames of surveillance images;

determining a number of pixels of the intrusion target according to the first target image and the second target image; and determining whether the intrusion target is a surveilled target according to the number of the pixels of the intrusion target and a pixel number threshold.

14. The non-transitory computer-readable storage medium according to claim 13, wherein a surveillance camera further comprises a system-on-chip (SoC); and wherein the computer program, when executed by the processor, implements in response to determining that the intrusion target is a surveilled target, switching the image sensor from the first image acquisition mode to the second image acquisition mode, and controlling the image sensor in the second image acquisition mode to acquire the surveillance image having the surveilled target in the following way:

in response to determining that the intrusion target is a surveilled target, waking up the SoC in a sleep mode, controlling, by the SoC, the image sensor to switch from the first image acquisition mode to the second image acquisition mode, and controlling, by the SoC, the image sensor in the second image acquisition mode to acquire the surveillance image having the surveilled target.

15. The non-transitory computer-readable storage medium according to claim 13, wherein the computer program, when executed by the processor, implements determining the number of the pixels of the intrusion target according to the first target image and the second target image in the following way:

calculating a difference between the first target image and the second target image to obtain a difference image;

determining spatially consecutive pixels whose pixel value is a first numerical value in the difference image; and determining the number of the pixels of the intrusion target according to a number of the spatially consecutive pixels.

16. The non-transitory computer-readable storage medium according to claim 13, wherein the computer program, when executed by the processor, implements determining whether the intrusion target is a surveilled target according to the number of the pixels of the intrusion target and the pixel number threshold in the following way:

in response to the number of the pixels of the intrusion target being greater than the pixel number threshold, determining that the intrusion target is a surveilled target; or in response to the number of the pixels of the intrusion target being less than or equal to the pixel number threshold, determining that the intrusion target is not a surveilled target.

17. The non-transitory computer-readable storage medium according to claim 13, wherein the computer program, when executed by the processor, after determining whether the intrusion target is a surveilled target according to the at least two frames of surveillance images, further implements:

in response to determining that the intrusion target is not a surveilled target, controlling the image sensor to acquire at least one frame of new surveillance image, and determining whether the intrusion target is a surveilled target according to one of the at least two frames of surveillance images and one of the at least one frame of new surveillance image; and in response to determining that the intrusion target is not a surveilled target according to one of the at least two frames of surveillance images and one of the at least one frame of new surveillance image, and that a number of times of acquiring the at least one frame of new surveillance image reaches a preset number of times, not switching the image sensor from the first image acquisition mode to the second image acquisition mode.

* * * * *